United States Patent [19]

Coathupe

[11] Patent Number: 5,280,667
[45] Date of Patent: Jan. 25, 1994

[54] COLLECTION DEVICES

[76] Inventor: John E. Coathupe, 15 Lynton Place, Broughton, Nr. Chester, CH4 ORP, England

[21] Appl. No.: 59,882

[22] Filed: May 7, 1993

Related U.S. Application Data

[63] Continuation of Ser. No. 958,541, Oct. 8, 1992, abandoned, which is a continuation of Ser. No. 660,570, Feb. 25, 1991, abandoned.

[30] Foreign Application Priority Data

Feb. 23, 1990 [GB] United Kingdom ............... 9004076.7

[51] Int. Cl.$^5$ .................................................. A47L 5/18
[52] U.S. Cl. .......................................... 15/409; 15/345
[58] Field of Search ................. 15/345, 346, 316.1, 15/405, 409

[56] References Cited

U.S. PATENT DOCUMENTS

| 751,786 | 2/1904 | Elston | 15/409 |
|---|---|---|---|
| 1,383,455 | 7/1921 | Farnsworth | 15/346 |
| 2,026,291 | 12/1935 | Tirimacco | 15/409 X |
| 2,902,708 | 9/1959 | Riley | 15/409 X |
| 3,004,279 | 10/1961 | Ringer | 15/340.1 |
| 3,525,474 | 8/1970 | Von Ohain et al. | 15/409 X |
| 3,704,482 | 12/1972 | Brannon | 15/409 X |
| 4,018,483 | 4/1977 | Smith | 15/409 X |
| 4,651,442 | 3/1987 | McIntyre | 15/316.1 X |

FOREIGN PATENT DOCUMENTS

| 890518 | 1/1982 | Belgium . | |
|---|---|---|---|
| 1572970 | 5/1969 | France . | |
| 2541701 | 8/1984 | France . | |
| 10179 | of 1904 | United Kingdom | 15/409 |
| 2152362 | 8/1985 | United Kingdom | 15/409 |

*Primary Examiner*—Chris K. Moore
*Attorney, Agent, or Firm*—Anthony J. Casella; Gerald E. Hespos

[57] ABSTRACT

The present specification discloses a collection device comprising an elongate duct for conveying loose material towards a downstream region thereof from a collection mouth at an upstream end thereof. at least one air outlet is disposed adjacent the collection mouth and arranged to in use direct an air flow transversely to the longitudinal axis of the duct over a curved, generally convex flow control surface of the collection mouth such that at least a portion of said air flow follows said curved surface and is directed downstream within said duct.

39 Claims, 2 Drawing Sheets

COLLECTION DEVICES

This application is a continuation of Ser. No. 958,541, filed Oct. 8, 1992, now abandoned, which is a continuation of Ser. No. 660,570, filed Feb. 25, 1991, and now abandoned.

The present invention relates to a collection device for use in collecting loose material from a surface.

More particularly the present invention relates to a collection device for use in collecting loose material such as litter, debris, lawn cuttings and/or fallen leaves. The collection device is primarily for outdoor use though it may equally well be used indoors as and when appropriate.

Existing collection devices such as domestic vacuum/suction cleaners are primarily designed for cleaning upholstery and carpets and are not really suitable for use outdoors. They are usually limited by weight, area of suction head and the cross-section of the tube connecting the suction head with a motor-driven fan for providing the suction, and a collection bag. Further, a large motor is required to overcome the various filters which are necessary whilst maintaining sufficient suction to extract/lift dirt, debris etc. and transport it to the collection bag.

Known industrial and horticultural vacuum/suction cleaners usually comprise an internal combustion engine, a fan and a collection bag. However, these devices are meant for use outside of a domestic situation and are generally large and expensive, and whilst mobile, they are not versatile.

In both of the above known collection devices the loose material which is collected has to pass through the fan arrangement and this can and does cause problems with larger items, such as empty drink cans. Further a large amount of suction force is required to lift the loose material, thus necessitating a large, powerful motor which clearly adds to the weight and cost of the collection device.

The aim of the present invention is to provide a collection device which is simple and relatively cheap to manufacture, and which does not have the problems of the prior art devices when handling various sizes of loose material.

According to the present invention there is provided a collection device comprising an elongate duct for conveying loose material towards a downstream region thereof from a collection mouth at an upstream end thereof, at least one air outlet being disposed adjacent the collection mouth and arranged in use to direct an air flow transversely to the longitudinal axis of the duct over a curved, generally convex flow control surface of the collection mouth such that at least a portion of said air flow follows said curved surface and is directed downstream within said duct.

By directing the air flow over a curved flow control surface, at least a portion of the air flow follows the contour of the curved flow control surface by virtue of the boundary layer effect. By having a very smooth curved flow control surface, laminar air flow is achieved and the boundary layer of air adjacent to the surface is very thin. In this instance a streamlined flow of air over the curved control surface results, and at least a major portion of the air flow follows said curved surface and enters said duct. Thus a positive air flow is provided along the duct away from the collection mouth, causing air to be drawn into the collection mouth together with any loose material in the vicinity of the collection mouth. The lifting of any such loose material, e.g. leaves, drink cans, etc., is enhanced by the fact that any such loose material will be near to one particular region of the curved flow control surface and the air thus increases speed in the gap between this one particular region and said material, causing a drop in air pressure in the gap, which drop in pressure pulls the loose material towards the curved flow control surface, i.e. the loose material is lifted off the ground.

The loose material is then passed along the duct to a collection container at the downstream region of the duct, by the air flow, and as the duct is merely a passage with no fan or other auxiliary component causing at least a partial obstruction or a tortuous flow path, it can provide a relatively smooth path which facilitates the collection of a large variety of shapes and sizes of loose material.

In a preferred embodiment of the present invention said duct is provided with outwardly flaring front and rear edge regions, each of which edge regions is curved and ends in an air flow outlet. Each air flow outlet is connected to a motor driven fan with the outlet being so designed as to direct a flow of air at an inclined angle to the longitudinal axis of the duct, substantially along a smoothly curved surface, into the duct, part of the outlet merging with the smoothly curved surface and said smoothly curved surface merely merging with and continuing as the inside wall of the duct. As previously mentioned at least a major part of the air flow will follow the curved surface and enter the duct due to the boundary layer effect, the remainder of the air flow disturbing the loose material beneath the collection mouth and thus facilitating the loose material being drawn into the duct by the air flow. Whilst the front and rear edge regions of the collection mouth may be provided with curved surfaces and associated air flow outlets, solely the front or rear edge region may be so designed or alternatively one or other side edge regions may be additionally or alternatively so designed, as is required.

The collection device is preferably designed so as to be hand-held with the motor driven fan being electrically driven. Alternatively, the device may be mounted on wheels and/or the fan may be driven by alternative power means, e.g. an internal combustion engine. Preferably the collection device is designed so that when it is hand-held, with the collection mouth aligned with the ground in a ready-for-use position, the elongate duct is inclined to the ground.

The collection container may be a disposable plastic bag which can be easily detachably attached to the downstream end region of the duct with a filter outlet allowing the air flow to escape adjacent to the container, or alternatively a loose-woven bag may form the collection container obviating the need for a filter outlet.

In a modified embodiment of the present invention a controllable air flow outlet is provided so as to allow a flow of air to be directed out from the collection device, as and when desired, preferably in the region of the collection mouth. By guiding the clllection device and thus the direction of this flow of air our from the collection device, material to be collected can be disturbed and/or collected together prior to the collection mouth being moved thereover.

The present invention will now be further described, by way of example, with reference to the accompanying drawings, in which.

Figure 1:
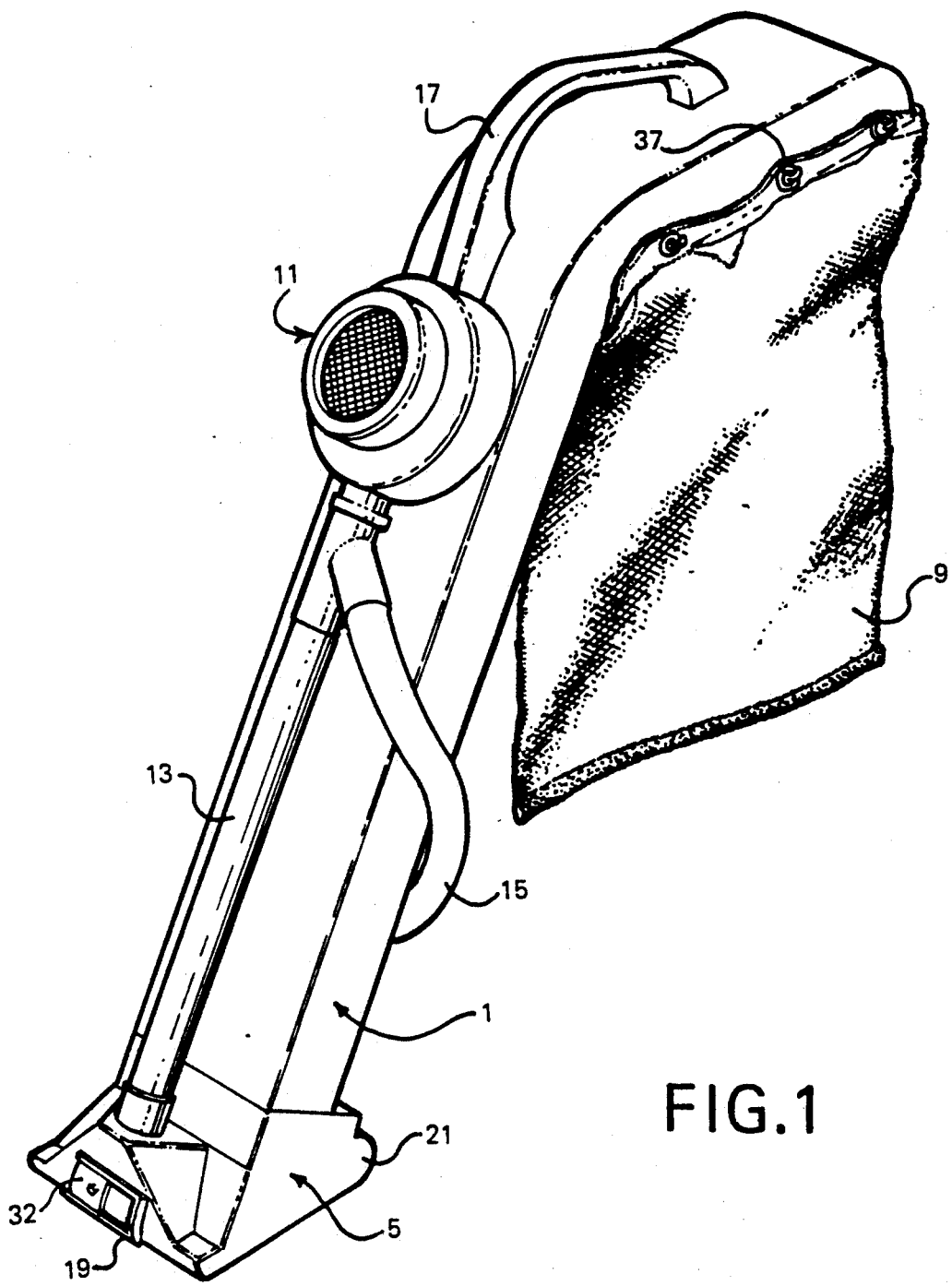
FIG. 1 is a perspective view of a presently preferred embodiment of the present invention.

The presently preferred embodiment of a collection device of the present invention illustrated in the accompanying drawings, comprises an elongate duct member 1 through which a generally smooth profile duct 3 extends, with a collection head 5 defining a collection mouth 7 at one end region i.e. the upstream end region, of the duct 3, and a collection container 9 detachably secured at the other end region i.e the downstream end region of the duct 3. The collection device includes an electric motor and fan 11 which is mounted on the outside of the duct member 3 and which connects with front and rear edge regions of the collection head 5 via pipes 13 and 15, respectively. The motor 11 and/or pipes 13 and 15 can of course be constructed as an integral part of the duct member 3 and hidden from sight within the duct member 3 to improve the aesthetics of the device. The motor 11 is connected to an electricity supply by a cable (not shown) and switched on and off by a switch provided in a handle 17, the handle 17 enabling the collection device to be moved by hand as desired, to pass the collection head 5 over loose material to be collected. As evident in FIGS. 1 and 3, the collection device is designed so that with the collection head 5 aligned with the ground, the duct 3 is inclined to the round, thereby facilitating entrainment of loose material along the duct 3 as compared to a vertical duct.

Figure 2:
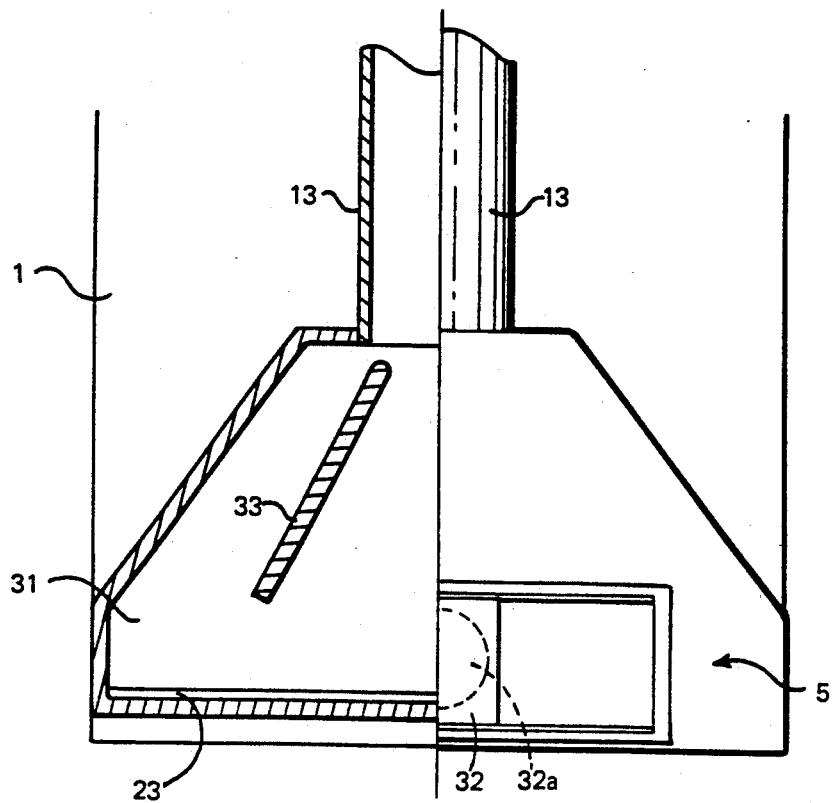
FIG. 2 is a front view, partially in cross section, of the lower part of the device of FIG. 1, which forms a collection mouth.
Figure 3:
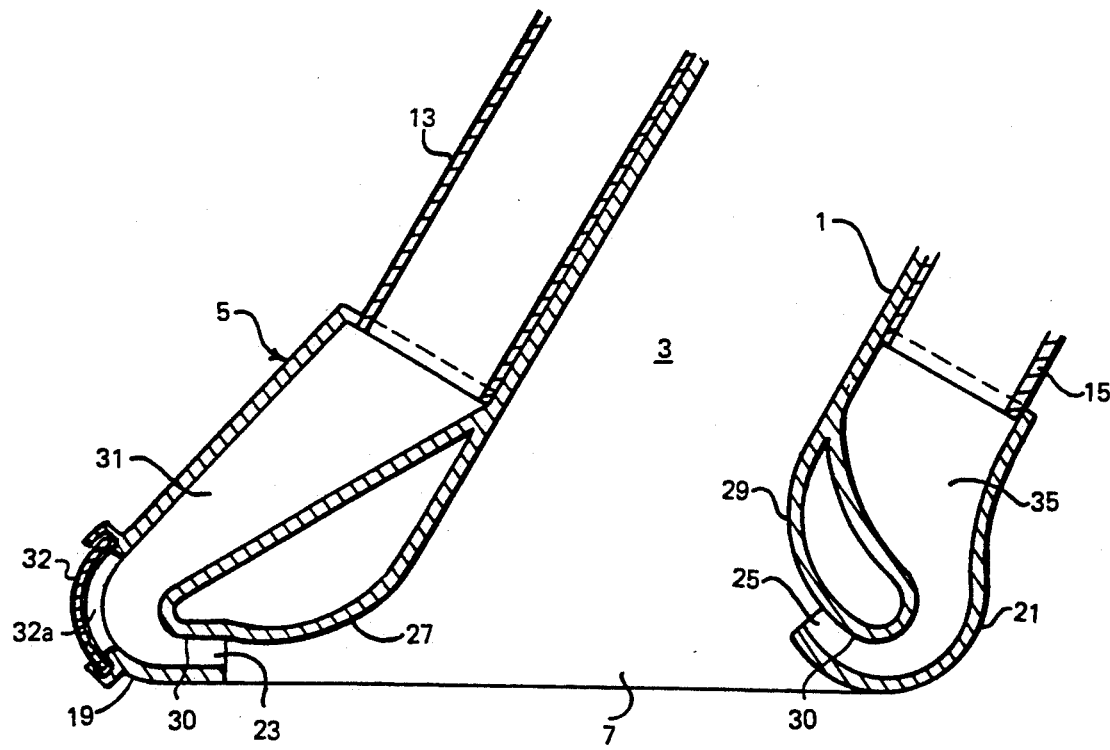
FIG. 3 is a cross-sectional side view of the lower part of FIG. 2.

The collection head 5, as best seen in FIGS. 2 and 3 of the accompanying drawings, is generally rectangular with front and rear edge regions 19 and 21 respectively, being each provided with an air outlet 23,25 which is arranged to direct an air flow generally along an adjacent curved surface 27.129, one part 30 of each air flow outlet 23,25 being formed by a continuation of the adjacent curved surface 27,29, to thus cause the air to flow along and against the respective curved surfaces. Due to the boundary layer effect, and the provision of a smoothly curved surface 27,29, laminar and streamlined air flow results so that the major part of the air flow from each outlet 23,25 follows the profile of the respective curved surface 27,29 into the duct 3, the remainder disturbing any loose material located beneath the collection mouth 7 and facilitating entrainment of this loose material into the air flow along the duct 3.

Entrainment of loose material into the air flow along the duct 3 is specifically enhanced by the fact that the material to be collected will be closer to one part of a curved surface 27,29 than another when the collection mouth 7 is passed thereover. Thus the air flow through the gap between the material and said close part of the curved surface 27.,29 will be increased causing a drop in air pressure in the gap and resulting in the material being drawn nearer to the curved surface, i.e. lifted off the ground, the air flow into the duct 3 carrying the material along the duct. 3.

The air outlet 23 at the front edge region 19 of the collection mouth 7, extends as a narrow slot across the width of the collection head 5, and leads from a plenum chamber 31 which is connected to air flow pipe 13. A number of angled baffles 33 are provided in the plenum chamber 31 to provide for an even distribution of the air flow emanating from the pipe 13, across the slot forming the outlet 23.

As will be seen in FIGS. 1 and 3 of the accompanying drawings, a slidable flap 32 is provided in the outer wall of the plenum chamber 31. Thus, when desired, this flap 32 can be moved to open a blower outlet 32a of the collection device, thereby providing a flow of air away from the collection head 5, which air flow can be used, by guiding the collection device and thus the direction of this air flow, to disturb and/or collect material together before the collection head is moved thereover. As opposed to the slidable flap 32, a hinged flap or any other controllable outlet can be substituted.

The air outlet 25 at the rear edge region 21 of the collection mouth 7, also extends as a narrow slot across the width of the collection head 5. This outlet 25 leads from a plenum chamber 35 which is connected to air flow pipe 15.

Whilst air outlets and associated curved surfaces are provided in the presently preferred embodiment of the present invention, at the front and rear edge regions of the collection mouth 7, one or other outlets could be omitted or blanked off, as desired. Further, air outlets and associated curved surfaces can be provided on the side edge regions of the collection mouth, additionally or instead of the outlets at the front and/or rear edge regions. Also, the collection mouth can be circular or oval with an outlet and curved surface provided continuously therearound. Further, the duct can be rectangular, circular or oval.

The collection container 9 is a loose-woven bag which is detachably mounted on hooks 37 at the other end region of the duct 3, the bag itself acting as an air flow escape filter. Alternatively, a disposable plastic bag can be detachably secured to the other end region of the duct 3 and in this case an air flow escape filter has to be additionally provided.

Whilst the motor 11 is described as being an electric motor 11 and this motor powers a fan which draws ambient air through a filter 39, and passes the air to the collection head 5, an internal combustion engine can be substituted to power a centrifugal blower fan, or an air compressor can be alternatively substituted.

In operation the air is blown over the or each curved surface in the vicinity of the collection mouth 7, this air tending to cling to the curved surface(s) due to the boundary layer effect and as with an aircraft wing, a drop in pressure is experienced above the curved surface causing an amount of lift to the loose material beneath the collection head 5. The loose material is thus drawn towards the curved surface(s) where it is entrained with the air flow along the curved surface(s) and into the duct 3. The amount of lift is dependent on the radius and nature of the curved surface, the amount of air flow and the speed of air flow. By suitable selection of these parameters, the desired performance for any particular situation can be achieved.

Whilst the presently preferred embodiment illustrated in the accompanying drawings is a hand-held and operated device, it is envisaged that wheels or rollers can be provided on large machines for use such as in parks and towns, to collect litter, leaves etc.

Whatever the required function, the present invention provides a collection device with a smooth profile duct which is free of any ancillary equipment such as an impeller, thereby obviating any possible obstruction or need for a tortuous path, for the loose material entrained in the air flow in the duct.

I claim:

1. A collection device for removing loose material from a fixed surface by means of a stream of air, said collection device comprising an elongate duct for conveying the loose material towards a downstream region thereof from a collection mouth at an upstream end thereof when the collection mouth is disposed over the fixed surface, at least one air outlet laterally offset outwardly of the throughflow cross-section of the duct, said at least one air outlet being disposed adjacent to the collection mouth and being arranged to direct air transversely of the longitudinal axis of the duct over a smooth uninterrupted surface which merges into a wall of the duct, and into the duct, at least part of said surface being convex so that air follows said surface and is directed downstream within said duct, said convex surface curving away from said fixed surface and merging into the wall of the duct when the collection mouth is located over said fixed surface in a ready for use position so that air flowing from the air outlet adjacent the collection mouth and over said convex surface lifts loose material from the fixed surface over which the collection mouth is located, and entrains said loose material into and along said duct.

2. A collection device as claimed in claim 1, wherein said air outlet is disposed within said collection mouth.

3. A collection device according to claim 1,, wherein said air outlet is arranged to direct said air flow in a direction which is inclined towards the longitudinal axis of said elongate duct.

4. A collection device according to claim 1, wherein the air flow outlet leads from a plenum chamber, a further controllable air flow outlet leading from the plenum chamber to allow air to flow from the plenum chamber to outside the device.

5. A collection device according to claim 1, wherein the air flow outlet is in the form of a narrow slot, one side of which slot is coplanar with the adjacent convex face.

6. A collection device according to claim 1., wherein the collection mouth is generally rectangular with the air flow outlet extending as a narrow slot which extends across the width of the collection mouth.

7. A collection device according to claim 6, wherein the air flow outlet leads from a plenum chamber, a number of angled baffles being provided in the plenum chamber to provide for an even distribution of the air flow across the slot forming the air flow outlet.

8. A collection device according to claim 11 wherein two such air outlets are provided, said air outlets being directed towards each other, located at opposite portions of the collection mouth, and arranged to, in use, direct air over respective convex flow control surfaces.

9. A collection device according to claim 1, said device being adapted to be hand-held with said collection mouth aligned with the ground or floor surface, the duct then being inclined to the ground or floor surface.

10. A collection device according to claim 1, wherein said air outlet is in the form of a slot which is aligned with the adjacent peripheral region of the collection mouth.

11. A collection device according to claim 1, wherein an integral motor-driven fan means is arranged to discharge air through said air outlet.

12. A collection device according to claim 1, wherein a removable collection container is arranged to collect and retain loose material which is conveyed towards said downstream region of said duct.

13. A collection device for removing loose material from a fixed surface by means of a stream of air, said collection device comprising an elongate duct for conveying the loose material towards a downstream region thereof from a collection mouth at an upstream end thereof when the collection mouth is disposed over the fixed surface, at least one air outlet being disposed adjacent to the collection mouth and being arranged to direct air transversely of the longitudinal axis of the duct over a smooth uninterrupted surface which merges into a wall of the duct, and into the duct, at least part of the surface being convex and disposed downstream of the collection mouth such that air follows said convex surface and is directed downstream within the duct, said convey surface curving curving away from said fixed surface and merging into the wall of the duct when the collection mouth is located over said fixed surface in a ready for use position so that air flowing from the air outlet adjacent the collection mouth and over said convex surface lifts the loose material from the fixed surface over which the collection mouth is located, and entrains said loose material into and along said duct.

14. A collection device as claimed in claim 13, wherein said air outlet is disposed within said collection mouth.

15. A collection device according to claim 13, wherein said air outlet is arranged to direct said air flow in a direction which is inclined towards the longitudinal axis of said elongate duct.

16. A collection device according to claim 13, wherein the air flow outlet leads from a plenum chamber, a further controllable air flow outlet leading from the plenum chamber to allow air to flow from the plenum chamber to outside the device.

17. A collection device according to claim 13, wherein the air flow outlet is in the form of a narrow slot, one side of which slot is coplanar with the adjacent convex surface.

18. A collection device according to claim 13, wherein the collection mouth is generally rectangular with the air flow outlet extending as a narrow slot which extends across the width of the collection mouth.

19. A collection device according to claim 18, wherein the air flow outlet leads from a plenum chamber, a number of angled baffles being provided in the plenum chamber to provide for an even distribution of the air flow across the slot forming the air flow outlet.

20. A collection device according to claim 13, wherein two such air outlets are provided, said air outlets being directed towards each other, located at opposite portions of the collection mouth, and arranged to, in use, direct air over respective convex flow control surfaces.

21. A collection device according to claim 13, said device being adapted to be hand-held with said collection mouth aligned with the ground or floor surface, the duct then being inclined to the ground or floor surface.

22. A collection device according to claim 13, wherein said air outlet is in the form of a slot which is aligned with the adjacent region of the collection mouth.

23. A collection device according to claim 13, wherein an integral motor-driven fan means is arranged to discharge air through said air outlet.

24. A collection device according to claim 13, wherein a removable collection container is arranged to collect and retain loose material which is conveyed towards said downstream region of said duct.

25. A collection device according to claim 13, wherein said at least one air outlet is laterally offset outwardly of the throughflow cross-section of the duct.

26. A collection device for removing loose material from a fixed surface by means of a stream of air, said collection device comprising an elongate duct for conveying the loose material towards a downstream region thereof from a collection mouth at an upstream end thereof when the collection mouth is disposed over the fixed surface, at least one air outlet leading from a plenum chamber and being disposed adjacent to the collection mouth, said at least one air outlet being arranged to direct air transversely of the longitudinal axis of the duct over a smooth uninterrupted surface which merges into the wall of the duct, and into the duct, at least part of said surface being convex and disposed downstream of the collection mouth so that air follows said convex surface and is directed downstream within said duct, said convex surface curving away from said fixed surface and merging into the wall of the duct when the collection mouth is located over said fixed surface in a ready for use position so that the air flowing from the air outlet adjacent the collection mouth and over said convex surface lifts the loose material from the fixed surface located beneath said convex surface, and entrains said loose material into and along said duct, a further controllable air flow outlet leading from one plenum chamber to allow air to flow from the plenum chamber to outside the device as and when required.

27. A collection device according to claim 26, wherein said at least one air outlet is laterally offset outwardly of the throughflow cross-section of the duct.

28. An air entrainment collection device for lifting material from a fixed surface resultant from a flow of pressurized air and entraining the so-lifted material in the flow of pressurized air to move the material along an unobstructed duct to a downstream region of the duct, comprising:
    means for creating a flow of pressurized air,
    an elongated and substantially unobstructed duct for delivering the so-lifted material from a collection mouth thereof to the downstream region thereof,
    a collector for receiving the material, means for detachably connecting the collector to the downstream region of the duct,
    at least one air outlet opening into the duct with the said at least one air outlet disposed adjacent to the collection mouth and arranged to direct the flow of pressurized air transversely of the longitudinal axis of the duct over a smooth uninterrupted surface which joins a wall of the duct, the said smooth uninterrupted surface having at least a part thereof which is convex so that air follows said convex part and is directed toward the downstream region of the duct, the said convex part curving away from the said fixed surface and meeting the wall of the duct at a position displaced downstream from the collection mouth when the collection mouth is located over said fixed surface in a ready for use position so that the flow of pressurized air which flows from the said at least one air outlet adjacent the collection mouth over said convex surface is sufficient to lift loose material from the fixed surface over which the collection mouth is located and to entrain said material into and along said substantially unobstructed duct for collection in the collector.

29. A collection device as claimed in claim 28, wherein said air outlet is disposed within said collection mouth.

30. A collection device according to claim 28, wherein said air outlet is arranged to direct said air flow in a direction which is inclined towards the longitudinal axis of said elongate duct.

31. A collection device according to claim 28, wherein the airflow outlet leads from a plenum chamber, a further controllable air flow outlet leading from the plenum chamber to allow air to flow from the plenum chamber to outside the device.

32. A collection device according to claim 28, wherein the air flow outlet is in the form of a narrow slot, one side of which slot is coplanar with the adjacent convex surface.

33. A collection device according to claim 28, wherein the collection mouth is generally rectangular with the air flow outlet extending as a narrow slot which extends across the width of the collection mouth.

34. A collection device according to claim 33, wherein the air flow outlet leads from a plenum chamber, a number of angled baffles being provided in the plenum chamber to provide for an even distribution of the air flow across the slot forming the air flow outlet.

35. A collection device according to claim 28, wherein two such air outlets are provided, said air outlets being directed towards each other, located at opposite portions of the collection mouth, and arranged to, in use, direct air over respective convex flow control surfaces.

36. A collection device according to claim 28, said device being adapted to be hand-held with said collection mouth aligned with a ground or floor surface, the duct then being inclined to the ground or floor surface.

37. A collection device according to claim 28, wherein said air outlet is in the form of a slot which is aligned with the adjacent peripheral region of the collection mouth.

38. A collection device according to claim 28, wherein an integral motor-driven fan means is arranged to discharge air through said air outlet.

39. A collection device according to claim 28, wherein said at least one air outlet is laterally offset outwardly of the throughflow cross-section of the duct.

* * * * *